Oct. 13, 1931.  A. DONADIO  1,827,568
AUTOMOBILE RADIATOR
Filed Nov. 14, 1929   2 Sheets-Sheet 1
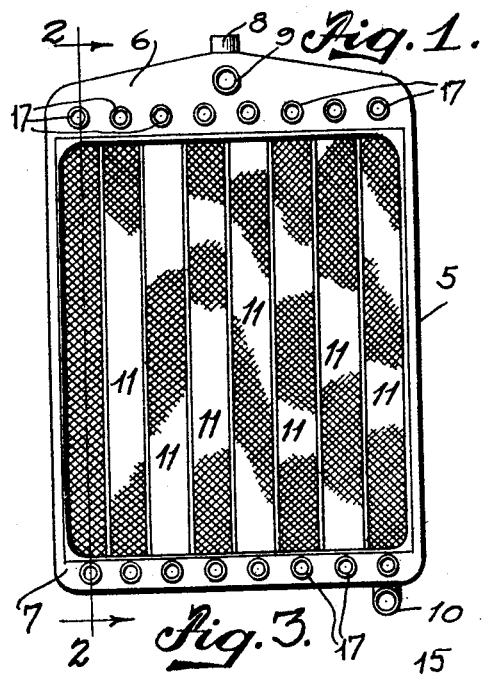
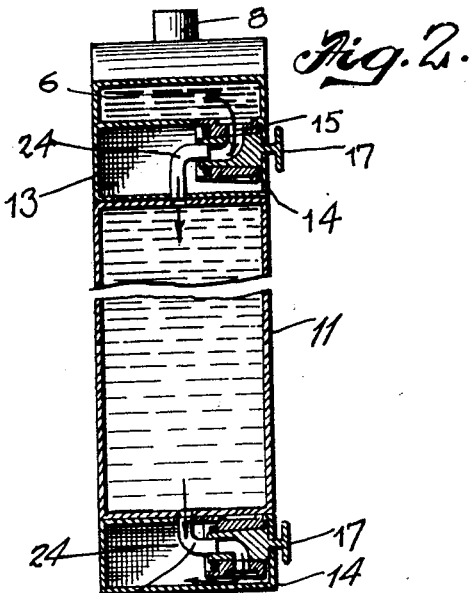
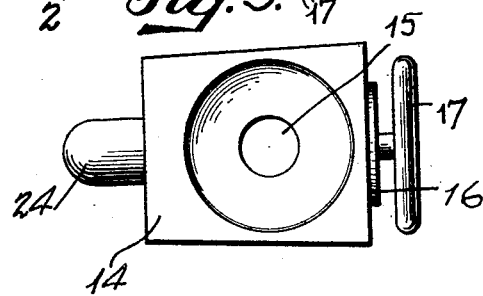
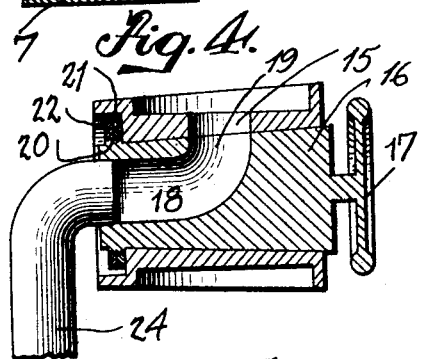
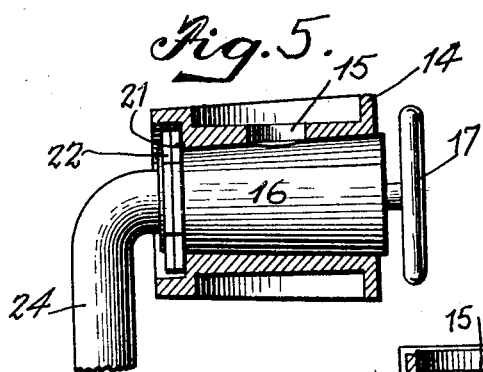
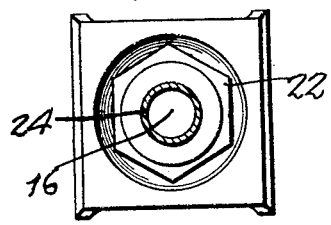
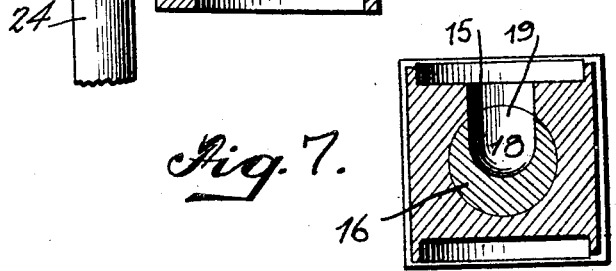
Inventor
Americo Donadio.

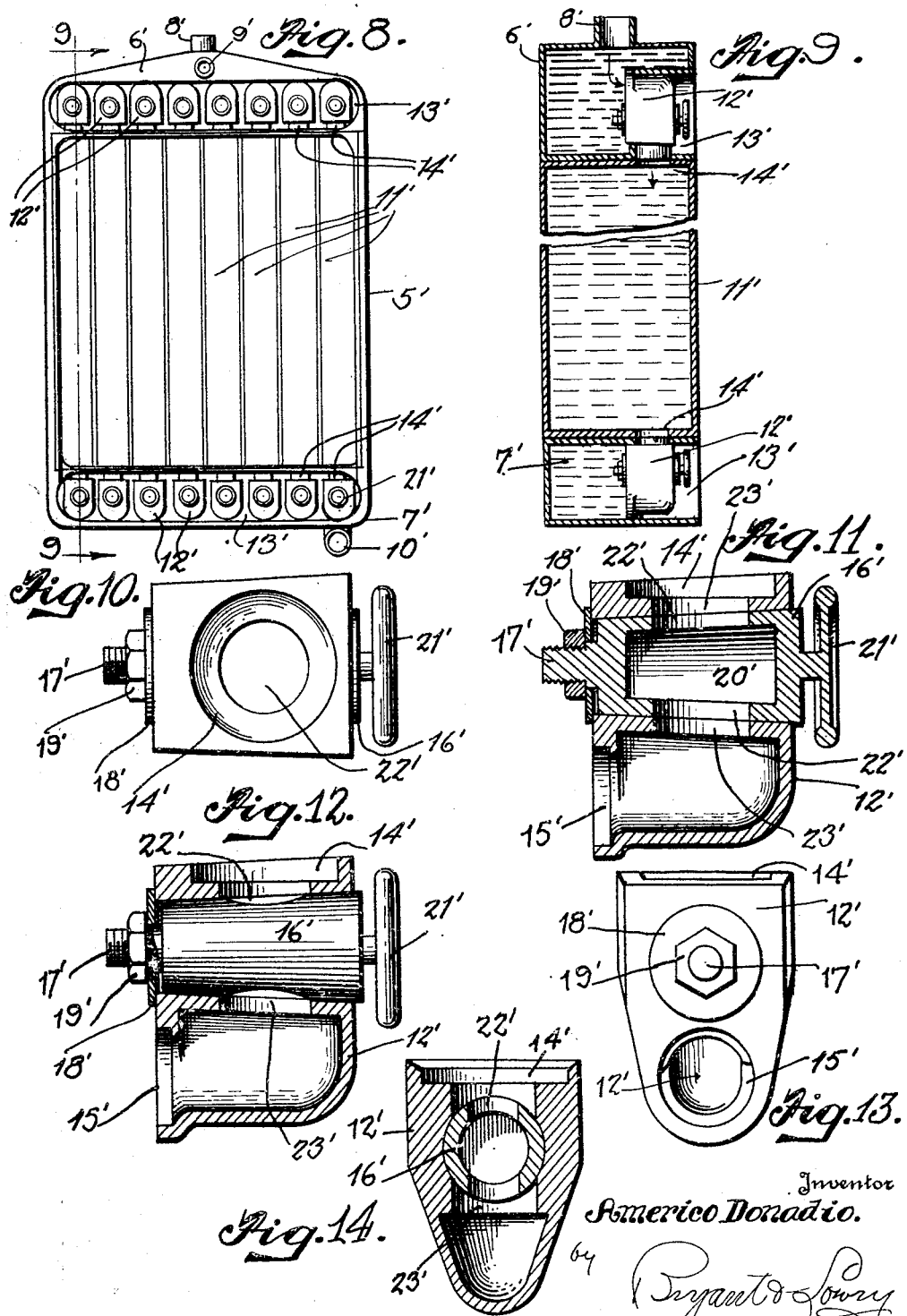

Patented Oct. 13, 1931

1,827,568

UNITED STATES PATENT OFFICE

AMERICO DONADIO, OF ROME, ITALY

AUTOMOBILE RADIATOR

Application filed November 14, 1929. Serial No. 407,195.

This invention relates to improvements in automobile radiators of the type employed in the cooling system thereof.

The primary object of this invention is to provide a plurality of removable and interchangeable cooling chambers or tube sections adapted to be independently shut off from the cooling system.

A still further object of this invention is to provide a device of the above mentioned character having an upper water tank and a lower water tank both of which are adapted for connection with an internal combustion engine cooling system and a plurality independent water cooling tubes extending between the upper and lower water tanks whereby upon operation of one or more valves interposed between the water tanks and cooling tubes, one or more cooling tubes may be shut off from the circuit.

A still further object of this invention is to provide a novel form of valve for accommodating the structure of the water cooling tanks, which usually are not very large and provide little space for valves or other mechanism.

Heretofore it has been common practice to provide weather shutters and other devices to cover the cooling portion of an automobile radiator in an endeavor to decrease or increase during different climatical temperatures the efficiency of the radiator thereby enabling the motor of the vehicle to function more properly.

Such practice is objectionable in many respects, namely, that the shutters are frequently, through negligence or carelessness failed to be operated or opened to give the motor sufficient cooling medium which results in scoring of the cylinder walls of the engine and over boiling.

A further salient feature of this invention is the manner in which the valves are arranged in order to cut off a section of the cooling tubes should a leak be caused therein through accident or vibration of the motor causing the usual cooling tubes to be defective.

Other objects and advantages of this invention will become apparent during the course of the following description forming a part of this specification and in which, Figure 1 is a rear elevational view of the invention showing the vertical independent cooling sections;

Figure 2 is a sectional view taken on line 2—2 of Figure 1 showing the upper and lower water tanks and the arrangement of the valves which are provided for each radiator tube section;

Figure 3 is a top elevational view of one of the controlling valves used in the water tanks for controlling the flow of water therethrough;

Figure 4 is a cross-sectional view of the same showing the construction of the valve and its relative parts;

Figure 5 is a fragmentary view partly in section, showing the rotary plug of one of the valves and its relation to the valve casing;

Figure 6 is an end elevational view of the valve showing the feed tube in section;

Figure 7 is a transverse cross-sectional view of the valve showing the bore of the rotary plug in alignment with the side port of the valve casing;

Figure 8 is a rear elevational view similar to Figure 1 showing a modified form of the invention;

Figure 9 is a cross-sectional view on line 9—9 of Figure 8, showing the modified form of arranging the valves;

Figure 10 is a top plan view of one of the valves used in the modified construction;

Figure 11 is a cross-sectional view of the same showing the valve casing interior and the rotary plug therein;

Figure 12 is a similar view partly in section;

Figure 13 is an end elevational view of the valve; and

Figure 14 is a transverse cross-sectional view of the modified valve showing the communicating ports of the valve and valve casing.

In the drawings, wherein in Figures 1 to 7 inclusive is shown a preferred example of the invention, the numeral 5 will generally be used to designate the frame of a vehicle cooling radiator core having an upper water tank 6 and a lower tank 7. The upper water tank 6 is provided with a filling spout 8 and a water inlet pipe 9 that is in communication with the water jacket or cooling chamber of an internal combustion engine through the medium of the usual hose connection. The lower water tank 7 is provided with an outlet 10 for connection to the lower portion of the cooling chamber of the engine.

The upper and lower water tanks 6 and 7 are connected by a series of independent and removable heat exchange sections 11 comprising vertical water tubes having heat radiating fins thereon. A rotary valve is arranged at each end of the several heat exchange tubes 11 for controlling the flow of water or other cooling medium from the upper tank 6 to the lower tank 7, the upper valve being mounted in the compartment 13 while the lower valve is located in the tank 7. Each valve comprises a casing 14 suitably anchored in position relative to the water tanks 6 and 7 by welding, soldering or the like. A side port 15 is formed in each valve casing 14, the valve casing in the compartment 13 having its side port registering with an opening in the lower side of the upper tank 6, while the valve casing 14 in the lower tank 7 has the side port thereof directed downwardly and spaced from the upper wall of the lower tank 7 and the bottom wall of the tube section 11. Each valve casing 14 houses a tapering rotary valve plug 16 that has an operating handle 17 positioned exteriorly of the rear walls of the compartment 13 and lower tank 7, respectively, for ease of operation. The smaller end of the tapered valve plug 16 is threaded as at 20 to receive securing nuts 21 and 22 engaged with the adjacent end of the valve casing 14 to rotatably retain the valve plug 16 in the casing. An axial bore 18 in the rotatable plug 16 opening at the reduced end thereof is angularly directed as at 19 toward one side of the plug for registration with the side opening 15 in the valve casing. An elbow pipe 24 has one end extending into the bore 18 at the axial end thereof, the elbow pipe 24 associated with the valve 14 in the compartment 13 entering an opening in the bottom wall of the compartment and registering with the opening in the upper end of the tube section 11 while the elbow pipe 24 associated with the valve 14 in the lower water tank 7 extends into an opening in the top wall of the tank 7 and in line with an opening in the bottom wall of the tube section 11.

The flow of water in circuitous travel is indicated by arrow lines in Figure 2, the water in the upper tank 6 flowing through the side opening 15 in the valve casing 14 and angle bore 18—19 in the valve plug 16, and through the elbow pipe 24 to the tube section 11, the water flowing downwardly through the tube section 11 and pipe section 24 associated with the lower valve casing 14 to enter the valve through the axial angle bore 18—19 and to outlet therefrom into the lower tank 7 by the side opening 15. From an inspection of Figure 2 it will be readily seen that the flow of water or other cooling medium from the upper tank 6 to the lower tank 7 is controlled by the valve at each end of the tube section 11, the normal operation of the cooling being unaffected by the presence of these valve devices. In the event of the presence of a leak in any one of the tube sections 11, or should the same be damaged in any manner resulting in leakage or stoppage of flow, any one of the tube sections may be disconnected from the circuit by closing the two valves associated therewith, the cooling medium continuing to flow through the other tube sections and performing their office. The tube sections 11 are readily removable for repair and replacement and the automobile may be operated with several of the sections removed.

In the form of the invention shown in Figures 8 to 14, the radiator core frame 5' includes upper and lower water tanks 6' and 7' respectively, a water filling spout 8' being carried by the upper tank, as is also a water inlet pipe 9' while the lower tank 7 is provided with a water inlet pipe 10', the pipes 9' and 10' being in communication with the water jacket of the internal combustion engine.

The upper and lower water tanks 6' and 7' are connected by a plurality of vertical water tubes 11' individually removable from the core frame and a valve structure 12' for controlling the flow of water from the upper tank 6' to the lower tank 7' through each water tube 11' is associated with each end of the several tubes and is mounted in a depressed portion or pocket 13' formed in the rear walls of the upper and lower water tanks 6' and 7' respectively.

Each valve 12' includes a side port 14' and an end opening 15'. A hollow tapered rotary valve plug 16' is mounted in each valve casing 12' and is provided with a threaded end extension 17' upon which is mounted a retaining washer 18' and a nut 19' for rotatably retaining the valve plug in the casing. The opposite end of the valve plug 16' is provided with an operating handle 21' disposed at the open side of the depression of pocket 13' to facilitate operation thereof. The hollow valve plug 16' is provided with diametrically opposite ports 22' adapted to register with corresponding ports 23' formed in the valve casing 12' to form communication between the side and end ports 14' and 15' respectively.

The valve casing 12' mounted in the depression or pocket 13' of the upper tank 6' is so disposed to present the end port 15' within the upper tank while the side port 14' communicates with the bottom wall of the tank 6' and in registration with an opening in the upper end of the tube 11'. The valve casing 12' located in the depression or pocket 13' of the lower tank 7' has the end opening 15' communicating with the lower tank 7' and the side port 14' entering an opening in the top wall of the lower tank and registering with an opening in the lower end of the tube 11'. Any one of the tubes 11' may be removed from the circuit by closing the valve plugs 16', and in other respects the operation of this form of the invention is comparable with the construction disclosed in Figures 1 to 7.

From the above detailed description of the invention, it is believed that the construction and operation thereof will at once be apparent, it being noted that the heat exchange tubes are so constructed and associated with the radiator frame to permit selective removal thereof so that in event of damage to any tube section, the same may be removed as a unit from the radiator assembly, after closing the valves associated therewith, with the remaining tube sections functioning in the usual manner, continued use of the automobile being possible upon removal of several of the tube sections, the cooling water circulating through the remaining tubes.

While there are herein shown and described the preferred embodiments of the invention, it is to be understood that minor changes may be made therein, such as will fall within the scope of the invention as claimed.

I claim:—

A cooling radiator for automobiles comprising a rectangular casing having an upper water chamber, a valve chamber located immediately below the same and having a flat bottom part devoid of connecting bosses and formed with apertures, rotary valves and valve casings located in said valve chamber and communicating with ports leading respectively to the water chamber and to the apertures in the bottom of the valve chamber, a plurality of slidably attachable and detachable water cooling sections located below said valve chamber and communicating with the upper chamber by way of the valve connections, a lower valve chamber, valves located therein and communicating with the cooling sections and with suitable outlets leading to the circulating system.

In testimony whereof I affix my signature.

AMERICO DONADIO.